United States Patent [19]

Grosh

[11] Patent Number: 4,790,049

[45] Date of Patent: Dec. 13, 1988

[54] ROPE LOCKING DEVICE

[76] Inventor: Jack F. Grosh, 2117 Sunnybank Dr., La Canada, Calif. 91011

[21] Appl. No.: 40,062

[22] Filed: Apr. 20, 1987

[51] Int. Cl.[4] .......................................... F16G 11/00
[52] U.S. Cl. ........................... 24/132 WL; 24/134 R; 74/96; 74/569
[58] Field of Search ............... 188/65.1; 254/250, 251; 272/11; 24/132 R, 132 WL, 134 R, 134 KB, 134 L, 134 P, 516, 504, 540, 541; 74/569, 96

[56] References Cited

U.S. PATENT DOCUMENTS

| 805,631 | 11/1905 | Chapman | 24/134 R |
|---|---|---|---|
| 1,209,294 | 12/1916 | Heywood | 74/569 |
| 1,399,182 | 12/1921 | Benedict | 24/134 KB |
| 2,317,812 | 4/1943 | Schmid | 74/569 X |
| 3,221,564 | 12/1965 | Raymond | 74/569 |
| 3,327,999 | 6/1967 | Mitchell | 24/134 R |
| 3,545,415 | 12/1970 | Mori | 74/569 X |
| 3,681,543 | 8/1972 | Schratz et al. | 74/569 X |
| 3,967,349 | 7/1976 | Christensen | 24/132 WL X |
| 4,085,634 | 4/1978 | Sattler | 74/569 X |
| 4,465,011 | 8/1984 | Merry | 24/134 L X |

FOREIGN PATENT DOCUMENTS 265357 2/1927 United Kingdom ............. 24/134 R

Primary Examiner—Kenneth J. Dorner
Assistant Examiner—James R. Brittain
Attorney, Agent, or Firm—Roth & Goldman

[57] ABSTRACT

A hand operable rope locking device which avoids sliding metal to metal contact of the wearing parts and uses a roller engageable in over center relation with a replaceable elastomeric insert in a pivotally mounted metal locking dog.

4 Claims, 2 Drawing Sheets

ROPE LOCKING DEVICE

BACKGROUND AND DESCRIPTION OF PRIOR ART

The present invention relates to mechanical locking devices for positively clamping and holding a tensioned rope in a desired position. Although such devices are useful in a variety of applications, one particularly important use of such devices is in holding ropes used in stage theatres which raise and lower a plurality of different sets into and out of operative position on the theatre stage. Such sets are often quite heavy, yet are usually moved by hand and therefore hand operable quick release and locking devices are required to safely hold the tensioned ropes in position.

The locking devices which have reliably performed for years generally consist of a pair of opposed locking dogs between which the rope is clamped. A pivotally mounted handle provided with a camming surface is operatively engaged in sliding metal to metal contact with one of two pivotally mounted opposed locking dogs as the clamping device is actuated. The metal to metal contact between the camming surfaces on the handle and dog has been found to cause rapid wear of the handle or of the dog, or both with consequent increase in the possibility of slippage of the clamped rope and danger to personnel in the area of the theatre sets.

It is therefore the object of the present invention to provide a rope locking device which has easily replaceable parts and which is less difficult to move into and out of operative clamping position than the prior art arrangements.

DETAILED DESCRIPTION OF THE PREFERRED EMBODIMENT

Figure 1:
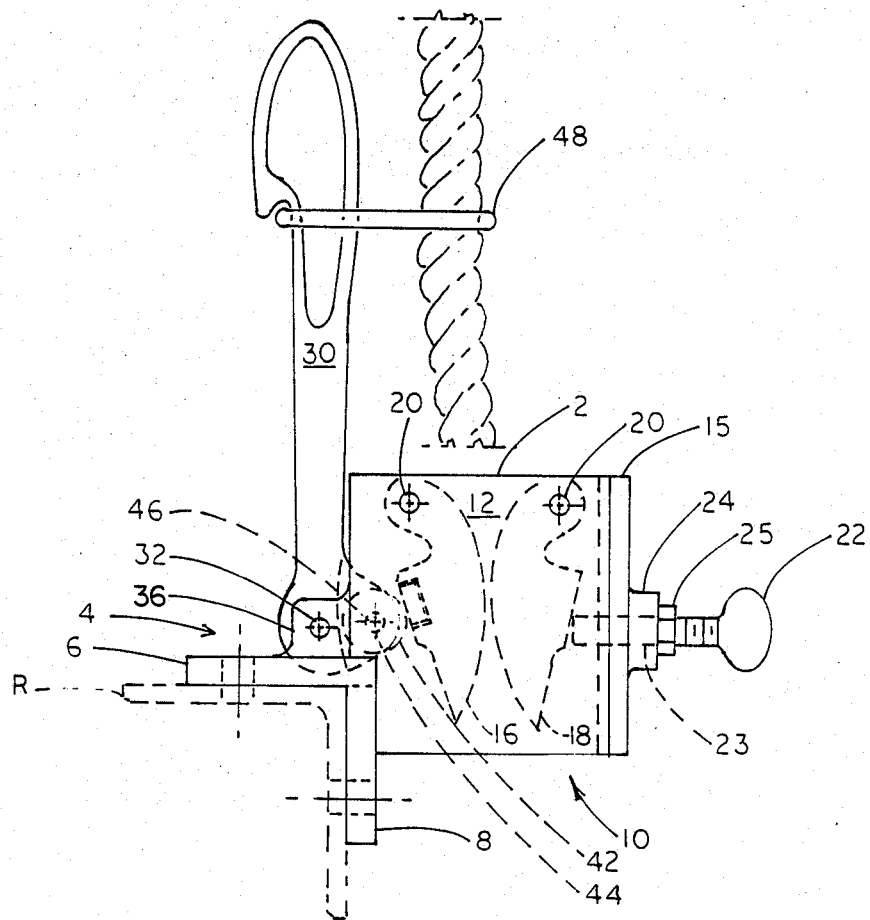
FIG. 1 is a front elevation view of the rope locking device of the present invention.

In a typical theatre set arrangement a plurality of the locking devices seen in FIG. 1 will be mounted in series on a generally horizontally extending mounting rail R shown in phantom. For this purpose, the rope locking device comprises a housing 2 having an angular mounting portion 4 which includes a horizontally extending leg 6 and an integrally formed vertical leg 8 extending downwardly therefrom. The horizontally extending leg 6 and the vertically extending leg 8 are each provided with a pair of bolt holes (unnumbered) for fastening the device by threaded bolts, not shown, to the mounting rail R.

Figure 3:
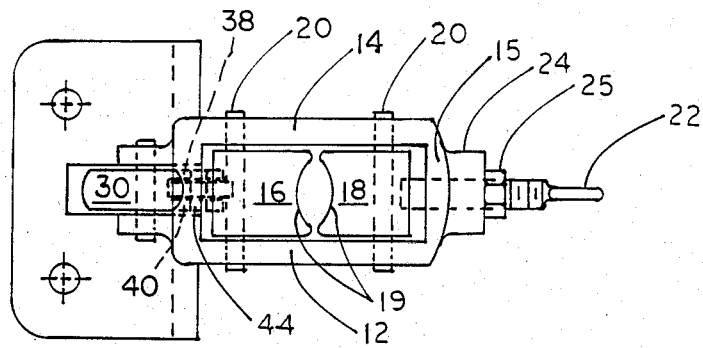
FIG. 3 is a top plan view of the device of FIG. 1.

The mounting portion 4 is preferably integrally cast together with housing portion 10 comprised of a vertically extending pair of spaced walls 12, 14 joined on the side opposite the mounting portion by an end wall 15. A pair of opposed locking dogs 16, 18, are pivotally mounted on pivot shafts 20 extending between the spaced walls 12, 14 so that the rope to be clamped can extend generally vertically between the spaced walls 12, 14 and the dogs 16, 18. As seen in FIG. 3, the rope engaging surfaces 19 of the locking dogs 16, 18 are arcuately formed to approximate the surface curvature of the rope so as to provide a good clamping surface.

A threaded adjustment thumbscrew 22 extends through a threaded bore 23 in a boss 24 on the end wall 15 to limit the degree of pivotal movement of the right hand (as seen in FIG. 1) locking dog 18 so that the device can be adjusted as desired to accommodate ropes of various diameters. A jam nut 25 threaded onto the thumbscrew shaft into abutment with the boss 24 retains the thumbscrew 22 and dog 18 in the selected position.

A vertically extending handle 30 is pivotally mounted at 32 between a pair of vertically extending bosses 34, 36 on the upper surface of the horizontally extending leg 6 of the mounting portion 4. The handle 30 is in turn provided at its lower end with a pair of spaced ears 38, 40 between which is a metal roller 42 rotatably mounted on a pin 44 extending through opposed apertures 46 in the spaced ears 38, 40. A safety loop 48 is also provided for fastening the upper handle end to the rope to prevent inadvertent disengagement of the device from its locked position.

Figure 5:
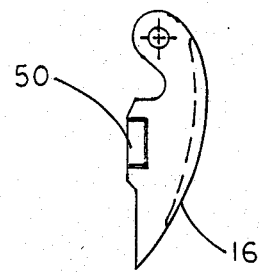
FIG. 5 is a detail view of one of the locking dogs shown in FIG. 1 showing an elastomeric insert.
Figure 6:
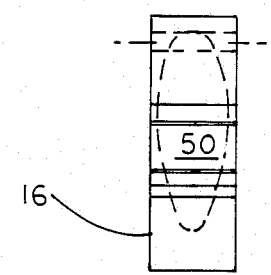
FIG. 6 is a right hand elevation view of the locking dog seen in FIG. 5.
Figure 2:
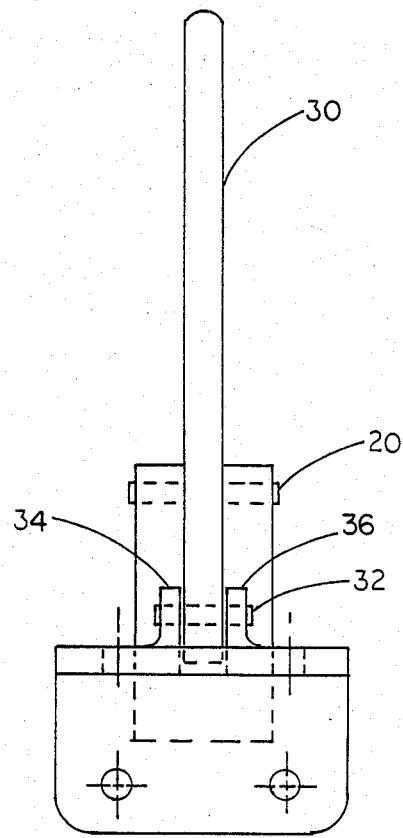
FIG. 2 is a left side elevation view of the device of FIG. 1.
Figure 4:
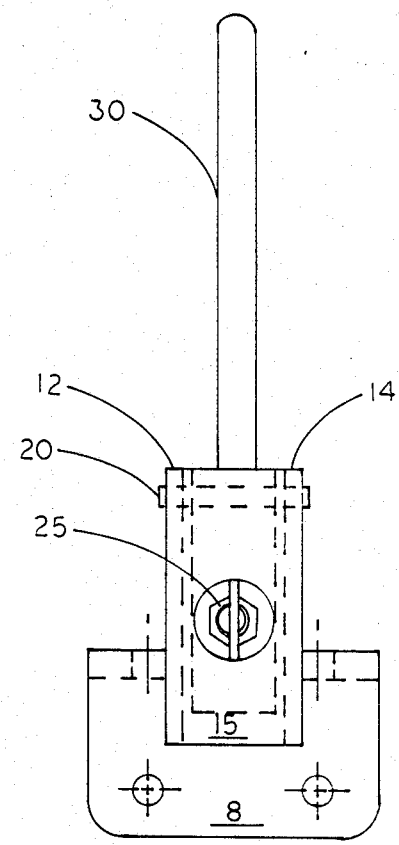
FIG. 4 is a right side elevation view of the device of FIG. 1.

Turning now to FIGS. 5 and 6, it will be seen that the left hand (as viewed in FIG. 1) dog 16 is provided with a notched portion which receives an elastomeric insert 50 in the areas of intended contact with the roller 42. A suitable elastomer for the intended purpose must have a high compressive strength to bear the high loads encountered and minimize abrasion and wear, a relatively low coefficient of friction and must be bondable with commercially available bonding agents to metal. The material should have a durometer shore hardness of at least 80A (measured according to ASTM D676-59T) of 80A and preferably 95A. One particularly suitable elastomer is ADIPRENE thyp L 167 (trademark of Uniroyal, Inc.).

The roller 42 on the locking handle is so positioned as to provide an over center locking engagement of the roller 42 with the elastomeric insert 50 on the locking dog 16. The slight compressibility of the insert 50 as it is engaged by the roller 42 facilitates this purpose as compared with the prior art sliding metal to metal contact of a camming surface on the handle with the metal cam engaging surface on the dog. Elimination of the metal to metal sliding contact and replacement with a roller 42 engageable with a replacable elastomeric insert 50 has been found to result in a device which is easier to lock and which does not result in wear of the metal parts. The primary wear part is the elastomeric insert 50 which is readily replaced when worn. For this latter purpose, the dog 16 is mounted on an easily removable pivot shaft 20 so that the entire dog 16 can be removed from the housing portion 10 to replace the worn insert 50.

Persons skilled in the art will readily appreciate that various modifications can be made from the preferred embodiment thus the scope of protection is intended to be defined only by the limitations of the appended claims.

I claim:

1. In a rope locking device having a housing, a pair of opposed dogs pivotally mounted on said housing between which the rope is to be clamped and a handle pivotally mounted on said housing, said handle having an engagement portion for moving one of said dogs into engagement with the rope to be clamped, the improvement comprising an elastomeric insert on the surface of the locking dog to be engaged by said handle portion and a rotatable roller on said handle engagement portion engageable in over center locking arrangement with said elastomeric insert such that in a locking position of said handle, said elastomeric insert is compressed by said roller and movement of said handle from said locking position toward an unlocking position first causes said roller to further compress said elastomeric insert before relieving said compression as said handle moves to the unlocking position.

2. A rope locking device according to claim 1, wherein said locking dog having said elastomeric insert is mounted on an axle pin which is removably fastened between spaced walls of said housing.

3. A rope locking device according to claim 2, wherein said elastomeric insert has a shore durometer hardness of at least 80A.

4. A rope locking device according to claim 3, wherein said shore durometer hardness is 95A.

* * * * *